United States Patent [19]
West

[11] 3,949,368
[45] Apr. 6, 1976

[54] AUTOMATIC DATA PRIORITY TECHNIQUE

[75] Inventor: Joseph Thomas West, Boxboro, Mass.

[73] Assignee: Data General Corporation, Southboro, Mass.

[22] Filed: Jan. 23, 1974

[21] Appl. No.: 436,022

[52] U.S. Cl. .......................................... 340/172.5
[51] Int. Cl.² ...................................... G06F 13/00
[58] Field of Search ............................. 340/172.5

[56] References Cited
UNITED STATES PATENTS

| | | | |
|---|---|---|---|
| 3,275,991 | 9/1966 | Schneberger | 340/172.5 |
| 3,292,153 | 12/1966 | Barton | 340/172.5 |
| 3,333,252 | 7/1967 | Shimabukuro | 340/172.5 |
| 3,339,183 | 8/1967 | Bock | 340/172.5 |
| 3,344,405 | 9/1967 | Craft | 340/172.5 |
| 3,693,165 | 9/1972 | Reiley | 340/172.5 |

*Primary Examiner*—Gareth D. Shaw
*Assistant Examiner*—James D. Thomas
*Attorney, Agent, or Firm*—Jacob Frank

[57] ABSTRACT

A system for automatically maintaining a record for an order of data priority of data stored in locations of an associative memory which compares the data stored in the locations with newly received data to generate a comparison output and where the order of priority is based on usage of data, comprising a read only memory a bit configuration reflecting an algorithm, connected from the associative memory for generating a first set of signals defining the least recently used location of the associative memory and for generating a second set of signals defining the order of word priority in terms of the associative memory locations, and a storage unit for receiving the second set of signals for subsequent feedback to the read only memory for re-defining the word priority as effected by newly received data.

7 Claims, 7 Drawing Figures

AUTOMATIC DATA PRIORITY TECHNIQUE

CROSS REFERENCE TO RELATED APPLICATIONS

Filed simultaneously with this application is a patent application assigned to the same assignee as this application, and is identified as Ser. No. 43,023 filed Jan. 23, 1974, entitled Memory Access Technique by William Philip Churchill, Jr.

FIELD OF THE INVENTION

The field of the art to which the present invention pertains is to associative memory systems in general and, in particular, to the improvement of automatically monitoring an order of priority of the content of an associative memory.

DESCRIPTION OF THE PRIOR ART

The use of an associative memory and, in particular, a content addressable memory, commonly referred to as the CAM, is frequently used in digital computer systems for increasing throughput by acting as a high speed catalyst. This is accomplished by automatically montitoring, through use of the associative memory, selected main memory active data addresses temporarily stored in high speed buffers or generally for keeping track of addresses which are stored in high speed buffers which may be used for a variety of purposes. By automatically storing the small number of currently active data words in a high speed buffer, this eliminates the need for repetitive access to the same areas of a comparatively slow main memory. Due to a commonly known "Principle of Locality," which states that for any short period of time program flow and operands tend to confine themselves to a few small areas within the total area of a main memory, a small well organized and maintained buffer can obviate the need for a substantial number of main memory accesses. It is the dynamic maintenance of this buffer which often becomes difficult, and yet is critical to a systems' success.

Every time main memory is accessed by the computer, the data word fetched and several others surrounding it must be stored in the high speed buffer, and a record stored in an associative memory of the new words' location within the buffer. As the buffer normally would already be filled with data from previous memory accesses, a decision must be made as to which storage location to erase to make room for the new data. Various replacement algorithms can be used e.g. first in first out, least frequently used, etc. However, a least recently used algorithm, although more difficult to implement, generally performs significantly better than others.

SUMMARY OF THE INVENTION

An object of the present invention is to provide a simple and efficient system for automatically maintaining an orderly record of priority, on the basis of least recent usage, of the addresses stored in the various locations of a relatively small fast memory. This is accomplished by the use of a read only memory system having a bit configuration representing an algorithm, that implements a least recently used data priority locating scheme, generating an output which defines not only the least recently used word, but in addition, generates a second output which denotes an order of priority of all the locations in the fast memory. A storage device stores the second output which is then available to be fed back together with the location in the fast memory of an address that matched new address information data received, into the read only memory for a subsequent read/write cycle. This allows the locating scheme, through use of the read only memory, to dynamically update the order of priority on the basis of the new address data and also to indicate the new least recently used location in the fast memory.

In a specific embodiment shown, the invention is depicted to be applied to a four word associative memory which is provided with an eleven bit wide memory address and a one bit validity indicator. The basic invention is shown to comprise of a read only memory including two units, each having eight bits of input. The first five bits of read only memory input come from a priority register which stores the history of the order of priority from the previous read/write cycle. Two more bits of entry into the ROM define the location in the associative memory where the next entry is made. This allows for updating the order to priority with the least recently used algorithm for each new read cycle.

The last bit is used as the valid or remove entry. If the new entry into the least recently used algorithm is in fact a valid access of the associative memory, then it is desired to make this the most recently used and push the remaining locations down. However, it may be desirable in certain instances, where a match has occurred in the associative memory, to invalidate the data in that location in the associative memory and then make that location the least recently used. This is accomplished by use of the last bit as a remove entry.

DESCRIPTION OF THE PREFERRED EMBODIMENT

Figure 1:
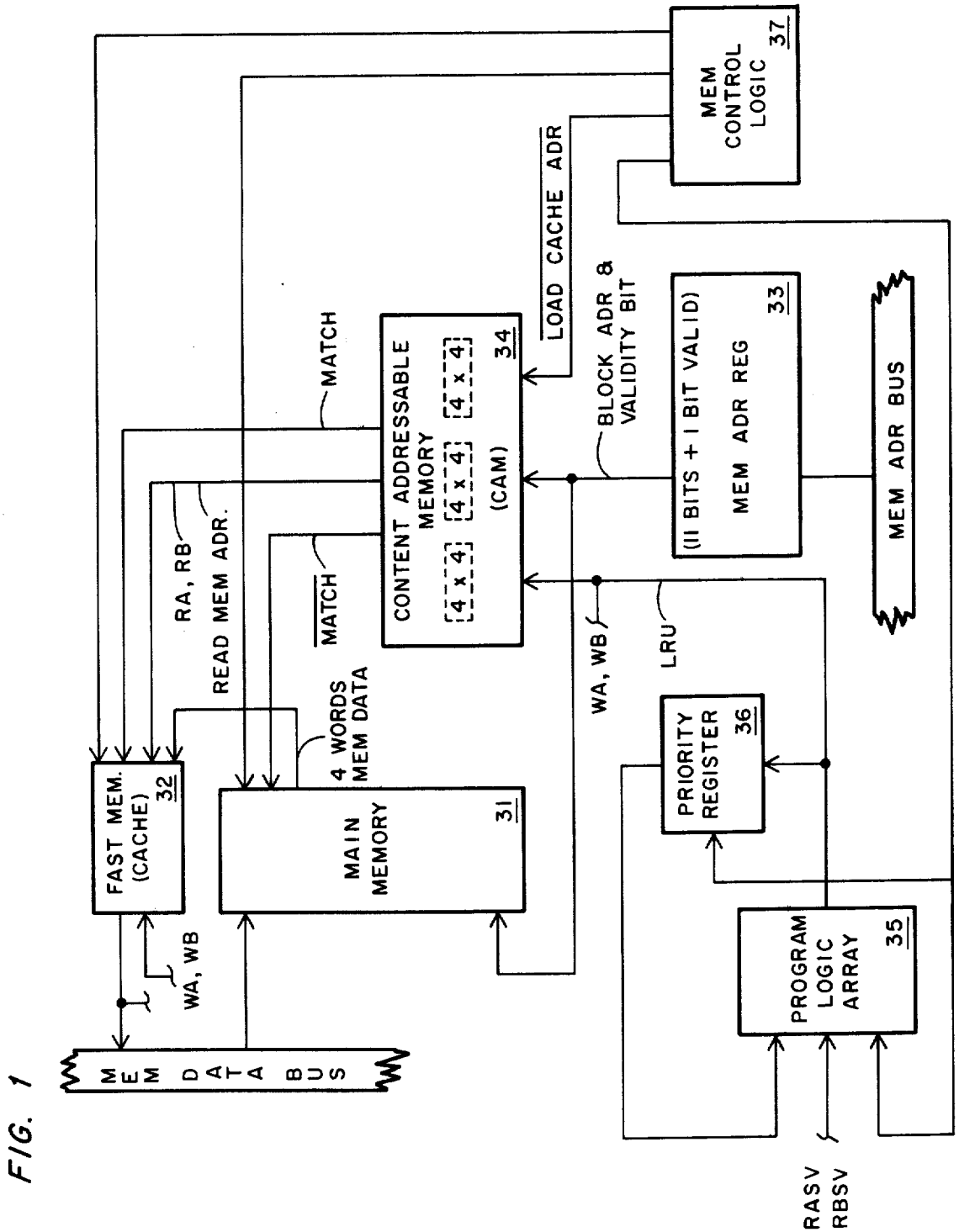
FIG. 1 is an overall block diagram of one embodiment of the invention in application to a cache and main memory configuration.

With reference to the drawings, a block diagram generally describing the present invention is illustrated at FIG. 1, wherein there is shown a main semi-conductor memory 31 having a cycle time, for example, of 600 ns and a smaller fast semi-conductor memory 32, generally referred to as a cache, having a cycle time, for example, of 100 ns to 200 ns. Main memory 31 is connected from the memory data bus and, in addition, from a memory address register 33, the latter in turn connected from the memory bus.

Connected from the memory address on register 33 is an associative memory in the form of a content addressable memory (CAM) 34, which is designed to compare data on its inputs with data already stored in its memory and indicates a match when these data are identical. This equality search is performed on all bits in parallel. The stored data is four 12-bit words and the signal input is one 11-bit word from the memory address register 33 and a validity bit 33. The outputs of CAM 34 include a match signal to a cache memory 32 and the main memory 31 and, in addition, an address denoted as RA and RB, designating a fast memory location in cache 32.

The main memory 31 is also connected for loading the cache 32 with four words or one block of memory data when instructed to do so. The WA and WB signals which are supplied to the cache 32 will always denote the cache address where the data from main memory is to be written, which is to be described in greater detail. This signal might also be called the LRU, as it identifies the location of the least recently used data in the cache system and then the cache address to be loaded, should a situation call for loading of the cache. The LRU signal is also supplied to an input of the CAM to update the least recently used data location of the CAM with the main memory address of the new data that is loaded in the cache.

The LRU is derived from a program logic array 35 which might comprise of a selected combination of discrete gates or a read only memory (ROM). The program logic array defines an LRU algorithm for the four word associative memory or CAM 34. The LRU algorithm is such that not only will the least recently used word be known, but also the next to least recently used word and so forth. This allows the LRU algorithm to be dynamically updated in terms of a time and usage basis as newly used information becomes available. In the present embodiment, since four words of data are to be used with the CAM 34 and cache 32, these might be defined as the MRU (most recently used), NMRU (next most recently used), NLRU (next least recently used) and LRU (least recently used). It is evident, that for these four words there are 24 possible states of the algorithm defining 24 distinct combinations of four word arrangements, depending upon the order of priorities ascertained.

In order to dynamically update the algorithm, it is necessary to know the state or order of priority of the immediately previous combination of four words, as well as the address in CAM 34 of the new information loaded from the memory address register 33. The WA and WB signals on the LRU lead denote the address location in the CAM 34 of the newly entered main memory address and the corresponding location in cache 52 of that address data for the newly entered information. The RASV and RBSV signals are delayed versions of the RA and RB signals, as will be discussed hereinafter, to identify the locations in the CAM, if any, which the new information matches. The information as to the absence of a match or if a match was matched, all contribute to re-establish the new order of priority for determining the new LRU data. As may be seen, the priority register is utilized for temporarily storing the immediately previous order of priority information, enabling it to be re-circulated during the next cycle back into the program logic array 35.

The memory control logic 37 is connected to each, cache 32, main memory 31, CAM 34, program logic array 35, and priority register 36, to ensure that the proper sequence of information handling is maintained, as will become evident hereinafter.

Figure 2:
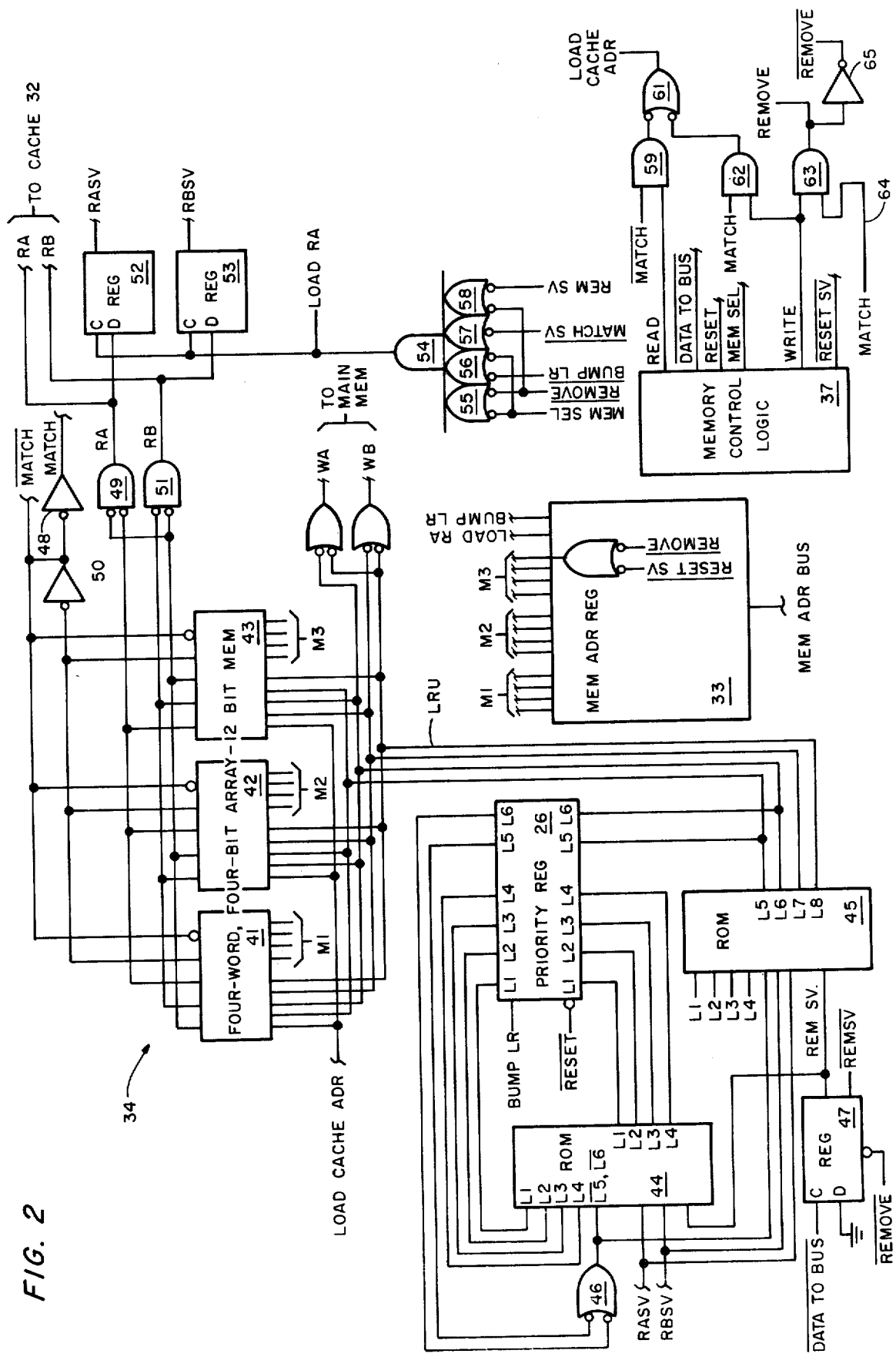
FIG. 2 is a circuit diagram of the CAM 34, program logic array 35 and priority register 36, and portions of memory control logic 37, shown in FIG. 1.

A more detailed description of CAM 34, priority register 36, and program logic array 35, may be seen with reference to FIG. 2, wherein there is shown a four word, four-bit array and twelve bit CAM 34 comprising units 41, 42 and 43. Four input LRU leads to each of these units contain LRU information and four other leads to these respective units comprise three sets of four bit inputs mutually denoted as $M_1$, $M_2$ and $M_3$. The outputs of the memory address register 33 comprise eleven bits, representing the signal received from the memory address bus, identifying the location in main memory 31 at which data is to be read in or written out. The 12th bit is a validity bit to denote a validity condition of the signal written in and therefore if written invalid, the other 11 bits will be ignored. Each of the three units 41, 42 and 43 are also fed with a LOAD CACHE ADR signal which, when enabled, allows the LRU identified address in CAM 34 to receive the newly entered main memory address from memory address register to update the units 41, 42 and 43.

The program logic array 35 is shown in the form of two read only memories, ROM 44 and ROM 45, each having common inputs including: $L_1$ through $L_4$ from the priority register; $\overline{L_5 + L_6}$ RASV and RBSV, and; REMSV. The signal REMSV to be discussed hereinafter will indicate whether a CAM stored main memory address is to be invalidated or not. One possible program logic array table for the ROM's is shown on the following page, where given each of the 24 different word state orders of priority is a binary output on leads $L_1$ through $L_8$. An octal output is provided for the eight binary output values on the leads of the combined ROM's 44 and 45.

PROGRAM LOGIC ARRAY WORD STATE TABLE

| Actual Word States | $L_1$ | $L_2$ | $L_3$ | Output $L_4$ | $L_5$ | $L_6$ | $L_7$ | $L_8$ | Output Octal Code |
|---|---|---|---|---|---|---|---|---|---|
| 1230 | 0 | 0 | 0 | 1 | 0 | 1 | 1 | 1 | 027 |
| 1320 | 0 | 0 | 1 | 0 | 0 | 1 | 1 | 1 | 047 |
| 2130 | 0 | 0 | 1 | 1 | 0 | 1 | 1 | 1 | 067 |
| 2310 | 0 | 1 | 0 | 0 | 0 | 1 | 1 | 1 | 107 |
| 3120 | 0 | 1 | 0 | 1 | 0 | 1 | 1 | 1 | 127 |
| 3210 | 0 | 1 | 1 | 0 | 0 | 1 | 1 | 1 | 147 |
| 0231 | 1 | 0 | 0 | 1 | 1 | 0 | 1 | 1 | 233 |
| 0321 | 1 | 0 | 1 | 0 | 1 | 0 | 1 | 1 | 253 |
| 2031 | 1 | 0 | 1 | 1 | 1 | 0 | 1 | 1 | 273 |
| 2301 | 1 | 1 | 0 | 0 | 1 | 0 | 1 | 1 | 313 |
| 3021 | 1 | 1 | 0 | 1 | 1 | 0 | 1 | 1 | 333 |
| 3201 | 1 | 1 | 1 | 0 | 1 | 0 | 1 | 1 | 353 |
| 0132 | 0 | 0 | 0 | 1 | 1 | 1 | 0 | 1 | 036 |
| 0312 | 0 | 0 | 1 | 0 | 1 | 1 | 0 | 1 | 055 |
| 1032 | 0 | 0 | 1 | 1 | 1 | 1 | 0 | 1 | 075 |
| 1302 | 0 | 1 | 0 | 0 | 1 | 1 | 0 | 1 | 115 |
| 3012 | 0 | 1 | 0 | 1 | 1 | 1 | 0 | 1 | 135 |
| 3102 | 0 | 1 | 1 | 0 | 1 | 1 | 0 | 1 | 155 |
| 0213 | 1 | 0 | 0 | 1 | 1 | 1 | 1 | 0 | 236 |
| 0213 | 1 | 0 | 1 | 0 | 1 | 1 | 1 | 0 | 256 |
| 1023 | 1 | 0 | 1 | 1 | 1 | 1 | 1 | 0 | 276 |
| 1203 | 1 | 1 | 0 | 0 | 1 | 1 | 1 | 0 | 316 |
| 2013 | 1 | 1 | 0 | 1 | 1 | 1 | 1 | 0 | 336 |
| 2103 | 1 | 1 | 1 | 0 | 1 | 1 | 1 | 0 | 356 |

In addition, there is a portion of one possible ROM truth table on the following page showing previous priority state possibilities and the variations of the inputs RASV, RBSV and REMSV along with the octal output code for each output state depending on the variation of the input signals. The octal input on the following page is based upon the following input signals in a left to right order: LR1; LR2; LR3; LR4; LR5 + LR6; RB; RA; REM. For example, in word order 0132, the Octal Input for Octal Output 047 would read left to right 000 10 000.

ROM TRUTH TABLE

| Word Order | Octal Input | Octal Output | Word Order | Octal Input | Octal Output |
|---|---|---|---|---|---|
| 0132 | 020 | 047 | 1032 | 060 | 047 |
|  | 021 | 035 |  | 061 | 035 |
|  | 022 | 253 |  | 062 | 353 |
|  | 023 | 075 |  | 063 | 075 |
|  | 024 | 035 |  | 064 | 075 |
|  | 025 | 336 |  | 065 | 356 |
|  | 026 | 236 |  | 066 | 276 |
|  | 027 | 135 |  | 067 | 155 |
| 1230 | 030 | 027 | 2130 | 070 | 067 |
|  | 031 | 236 |  | 071 | 256 |
|  | 032 | 313 |  | 072 | 313 |
|  | 033 | 027 |  | 073 | 027 |
|  | 034 | 115 |  | 074 | 115 |
|  | 035 | 067 |  | 075 | 067 |
|  | 036 | 316 |  | 076 | 356 |
|  | 037 | 127 |  | 077 | 147 |
| 0312 | 040 | 127 | 1302 | 100 | 047 |
|  | 041 | 055 |  | 101 | 035 |
|  | 042 | 253 |  | 102 | 333 |
|  | 043 | 075 |  | 103 | 115 |
|  | 044 | 055 |  | 104 | 115 |
|  | 045 | 273 |  | 105 | 067 |
|  | 046 | 236 |  | 106 | 276 |
|  | 047 | 135 |  | 107 | 155 |
| 1320 | 050 | 047 | 2310 | 110 | 107 |
|  | 051 | 035 |  | 111 | 233 |
|  | 052 | 353 |  | 112 | 313 |
|  | 053 | 047 |  | 113 | 027 |
|  | 054 | 115 |  | 114 | 155 |
|  | 055 | 067 |  | 115 | 107 |
|  | 056 | 316 |  | 116 | 356 |
|  | 057 | 127 |  | 117 | 147 |

When REMSV is true, it indicates a write instruction had occurred and address was matched at the zero location in the CAM 34 so that the zero location had to be invalidated and made the LRU as new information is to be written into that main memory address.

With reference to the above table, it will be seen that given an order of priority of 0132 for locations in the CAM 34 and cache 32, a different order of priority output (octal code) will result for different RASV, RBSV and REMSV signals. If RASV and RBSV are both zeros and REMSV is true, the new order of priority is changed to 1320 represented by octal code 047.

If this were not done, it can be readily observed that confusion might occur during the reading of subsequent information. When REMSV is false, information is not to be invalidated. However, since the zero location is the one that is matched and active, the same order of priority 0132 is maintained as is represented by the octal output 035 which can be verified by looking at the illustrated program logic array word state table above.

The four outputs from ROM 44 and the two outputs L₅ and L₆ from ROM 45, are connected back into the priority register 26 L₁ to L₆ to the inputs of ROM's 44 and 45, for allowing this information to be used during a subsequent cycle to establish a new set order priority should the signals RASV, RBSV and REMSV require such. As will be noted, the signals L₅ and L₆ in being returned to ROM's 44 and 45 are returned via a NOR gate 46. Furthermore, the REMSV signal from a register 47 is entered into ROM's 44 and 45 only upon the presence of a change in the order to priority, as when the address of information to be written in main memory matches a CAM address is to be invalidated and made the LRU. The DATA TO BUS signal is used to clear the REMSV on the next cache access.

It is also noted, signal BUMP LR triggers the priority register to enter into the ROM's the old priority order and then receive the new priority order for the next cycle in a manner to be hereinafter discussed.

The output of the CAM 34, including units 41, 42 and 43 provide, via an inverter coupling OR gate 50 and inverter 49, a MATCH AND $\overline{\text{MATCH}}$ indication respectively denoting whether or not the 11-bit address received from the memory address register is common to any one of the four word, 12 bit arrays stored in the CAM. Signals RA, RB denote the CAM location of the address of the data as to which a match has been detected. The signals RA and RB which are respectively derived from NAND gates 49 and 51 are mutually routed to registers 52 and 53, so that the signals RA and RB can be stored and supplied as RASV and RBSV during a successive cycle depending on whether the conditions entered into C input of the registers 52 and 53 are met.

As will be seen, memory control logic 37, upon the presence of a read and match false signal, will enable an AND gate 59 connected to one input of a NOR gate 51, the second input of NOR gate 61 supplied from an AND gate 62 having write and match inputs. These two inputs to NOR gate 61 generate a LOAD CACHE ADR signal. The output of AND gate 62 also provides a signal which may be denoted as BUMP LR. The write signal supplied to an input of an AND gate 63 is a write signal and MATCH signal to generate an output REMOVE. Other signals that are conventional put out by the memory control logic include a $\overline{\text{DATA TO BUS}}$ signal denoting that data has been put on the memory data bus. A reset signal for a resetting condition is also generated and a MEM SEL signal is generated denoting the loading of an address from the memory address bus into the memory address register 33. A $\overline{\text{RESET SV}}$ signal is also delayed for a subsequent cycle.

The BUMP LR signal from AND gate 62 occurs when the CAM has indicated a match in a WRITE condition. BUMP LR will also occur from the memory address register 33 in the form of a delayed load RA, whereby load RA denotes a previous READ operation with data loaded into the memory address register from the memory address bus. Thus, BUMP LR always enables the priority register to load the ROM's each time an operation has been effected in CAM 34 in a READ condition and a match occurs in a WRITE condition. No BUMP LR signal occurs when in a WRITE operation and match is false.

The various signals fed into the NOR gates 55 to 58 which are connected to AND gate 54, establish the condition LOAD RA which is generated immediately following the MEM SEL signal that occurs with a READ or WRITE signal at the loading of the memory address register.

OPERATION

Figure 3:
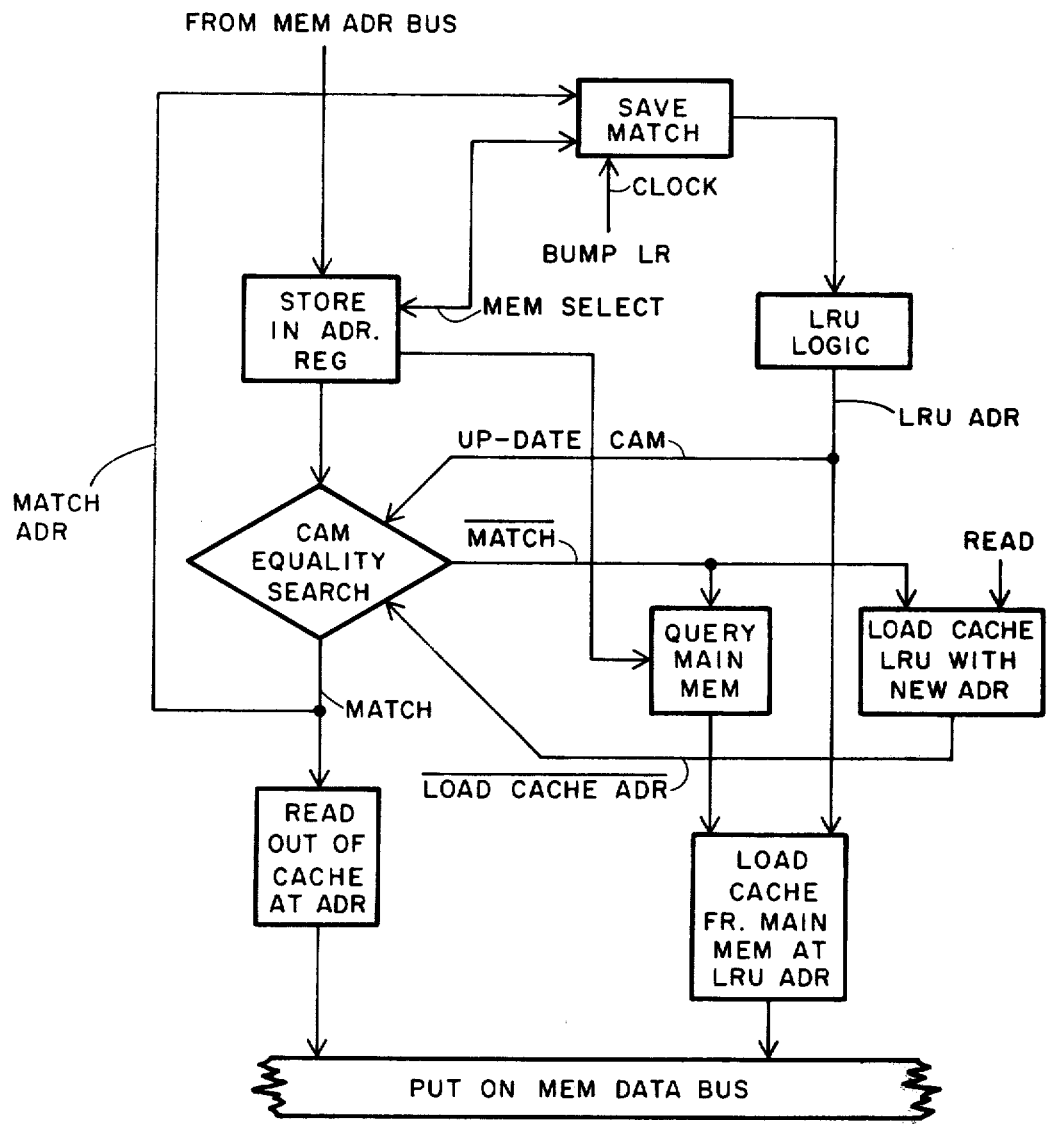
FIG. 3 is a flow diagram depicting the sequence of events in the present invention in a read cycle.
Figure 4:
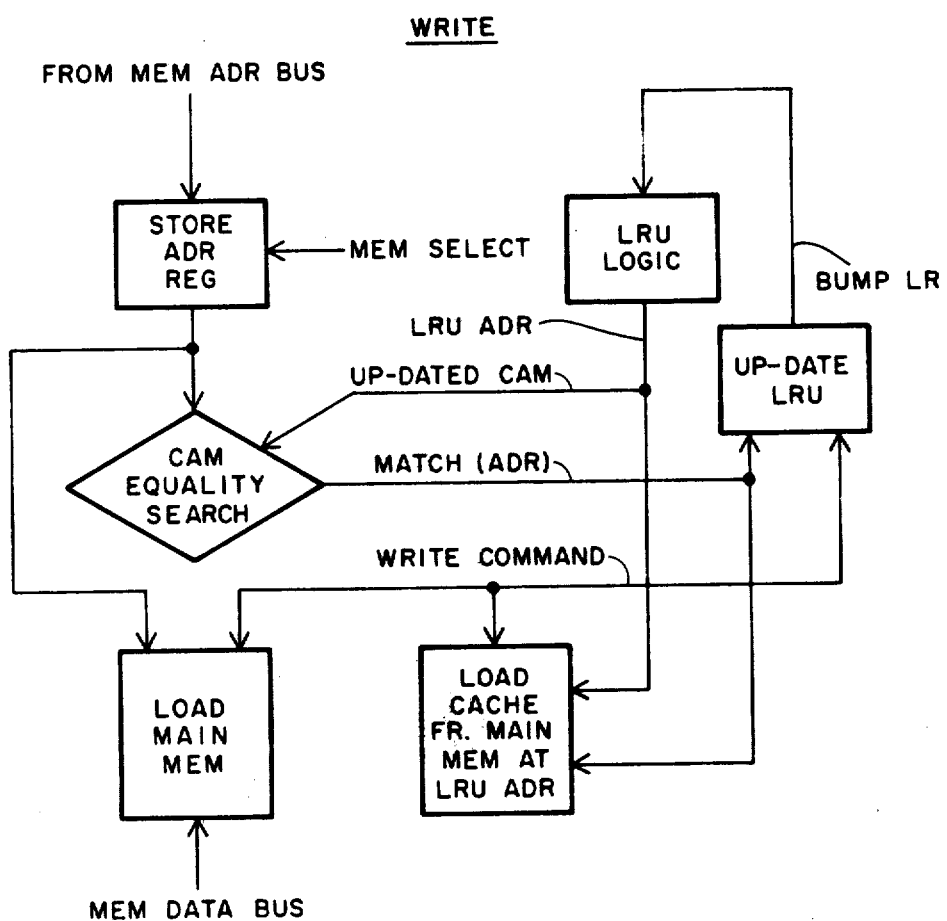
FIG. 4 is a flow diagram depicting the sequence of events in the present invention in a write cycle.
Figure 5:
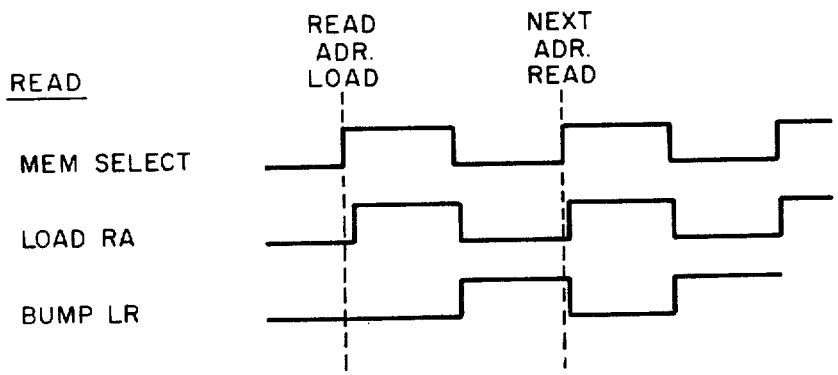
FIG. 5 is a series of time based waveforms illustrating with certain signals the manner of operation of the invention during a read cycle.
Figure 6:
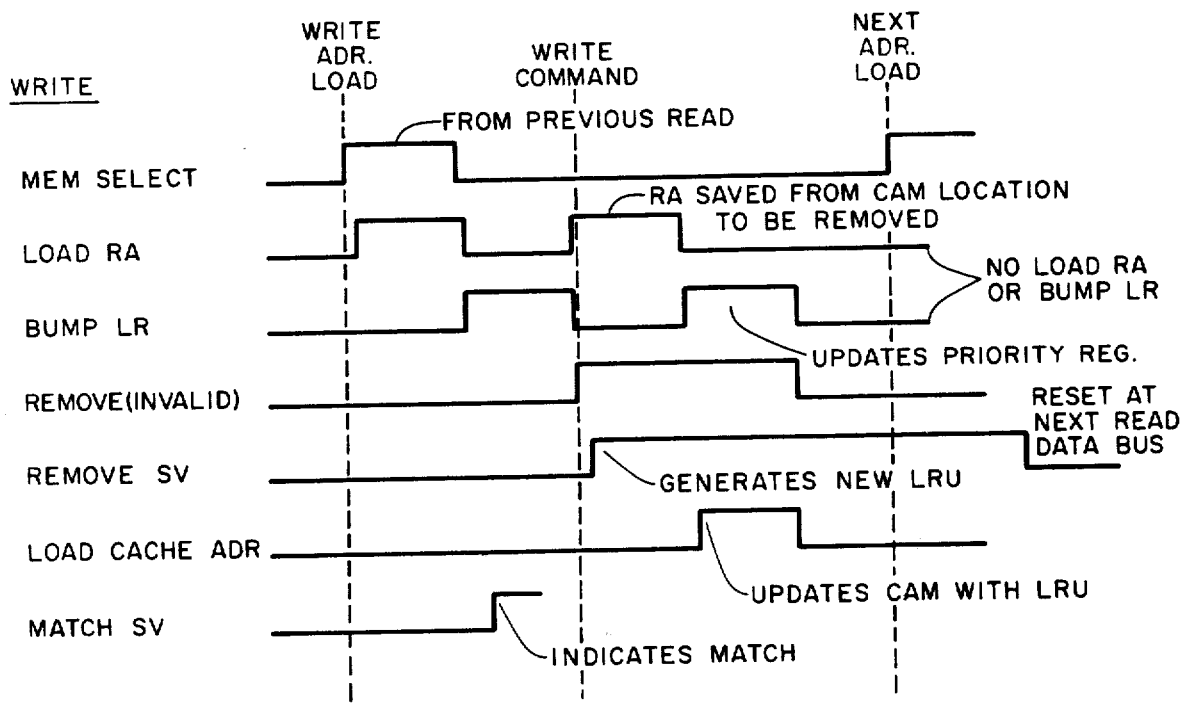
FIG. 6 is a series of time based waveforms illustrating with certain signals the manner of operation of the invention during a write cycle.

The operation of the present invention will now be discussed in connection with the flow diagrams for READ and WRITE conditions respectively depicted in FIGS. 3 and 4 and the waveform diagrams for the READ and WRITE conditions respectively depicted in FIGS. 5 and 6.

First, an assumption will be made that a READ condition exists where the computer is reading the address of a data word that is stored in the cache. The memory address of the data is read into the memory address register 33 from the memory address bus and then fed into the CAM 34 on level line M1, M2 and M3. The CAM has already been updated at the leading edge of LOAD RA with the previous LRU address information from ROM 45. In the CAM, an equality search is made between address and the four memory addresses stored in the CAM to ascertain whether or not a match exists.

Assuming a match is detected, this indicates that the memory address is already in the CAM and therefore the corresponding memory data is stored within the cache. Upon occurrence of a match, a match signal is generated at the output of Inverter 48 and signals RA and RB are also generated to identify at which one of four locations in the CAM a match occurred. The match location in terms of RA and RB is set into registers 52 and 53 to be saved for updating the priority register after this read cycle. At the same time, signals RA and RB identify the location of the data in the cache 32 which is to be read out onto the memory data bus. The BUMP LR signal, as may be seen from FIG. 5, which is LOAD RA delayed, enables the priority register 36 to store the order of priority generated during the present cycle. At the beginning of the next cycle, the RA and RB CAM location match saved from the previous cycle is generated and together with the signals $L_1$ through $L_6$ from priority register 36 are fed along with REMSV to ROM's 44 and 45. The information at the output LRU leads of ROM 45 is represented by WA and WB and is available for input to the CAM 34 allowing the CAM 34 location of the LRU information to be identified for loading in a memory address of new information upon the presence of a LOAD CACHE ADR signal. The LRU information represented by the WA and WB signals also is available for input to the cache 32 to identify the location in the cache at which data is to be read into from the main memory 31, in a manner hereinafter to be discussed.

Next, assuming that the computer reads a word which is not in cache, instead of having a MATCH output, a $\overline{\text{MATCH}}$ output is generated at the output of CAM 34. This output enables main memory to load the data at the address specified at the memory address register into the cache 32. The cache location in which the data is loaded is indicated by WA and WB which represent the location of the LRU information from the last cycle. This data is then read out of the cache onto the memory data bus. The $\overline{\text{MATCH}}$ signal also in turn generates the signal LOAD CACHE ADR to load the CAM with the new memory address information in the LRU/CAM location. This, of course, occurs before the BUMP LR signal causes the priority register to store the new order to priority.

IF REMSV is false, no invalidity of the address occurs and then the priority of the signals is changed so that the previous least recently used location in the CAM is provided with the new memory address and made the most recently used location and the previous next to least recently used location is now denoted as the LRU location.

Next, assuming that a WRITE condition exists, if the memory address information is not matched in the CAM 34, the data is written into the main memory address from the memory address register, but the priority register is not changed at all.

This, however, will not be the case when a MATCH occurs in the CAM during a WRITE operation. Again, a loading of the main memory 31 at the memory address from the memory address register. As may be seen with reference to FIGS. 4 and 6 at the MEM SEL signal, the memory address register is loaded. If a match occurs, the signals RASV and RBSV denoting the CAM location of the match cause that location to be made the LRU location upon the presence of a REMSV signal. At the same time, the REMOVE signal at the twelfth bit of the memory address register causes the address loaded into the CAM at that location where a match occurred to be invalidated, as the memory address has now been used for a write entry.

An interesting aspect of the machine may be seen with reference to when the computer would say "write something in a location" and then "read from that same location." What happens to the priority table in this case is that it never changes. For example, if one would consider the case where the computer reads that location, it puts the address read in the CAM and makes it the most recently used in terms of priority. The immediately next period when it goes to write in that same memory address location, it determines that the memory address location is in the CAM and invalidates that location to make it the least recently used in the priority truth table. The next occasion it goes to read that same location, it will now read from the same main memory address and load that CAM location (which is now the least recently used) and make it the most recently used location. As is evident here, the sequence goes back and forth, but what is important is that the other entries in the other three addresses in the CAM are undisturbed so that once a program stream is finished with this sort of re-cycling operation, it can proceed with previously stored information occurring before the re-cycling already in the cache.

It should be noted, that in a "power-up" condition, all the data in the cache is automatically invalidated by automatically setting all valid bits to false. This is effected for the reason that when "power-up" condition occurs, because of the fact that the cache and CAM used are semi-conductor memories and therefore will power up in a random state. It should be evident from the occurrence of "power-up", that although the CAM is completely invalidated, it is forced to pseudo-priority so that one can never have the same two words in cache simultaneously.

This occurs as a consequence of the proper use of the determinations MATCH and $\overline{\text{MATCH}}$, whereby in a CAM match, the order of priority of the addresses already within the priority register is properly updated by the ROM's 44 and 45 which consider the new location of the newly entered memory address which caused the $\overline{\text{MATCH}}$ signal to occur.

As may be observed from the above, the two bits RASV an RBSV comprise information for causing the ROM's 44 and 45 to the arrangement of the order of word state priority stored in the priority register, whereas the last bit or REMSV is used to invalidate, if necessary, information stored in a specific location of the CAM.

ALTERNATE EMBODIMENT

Figure 7:
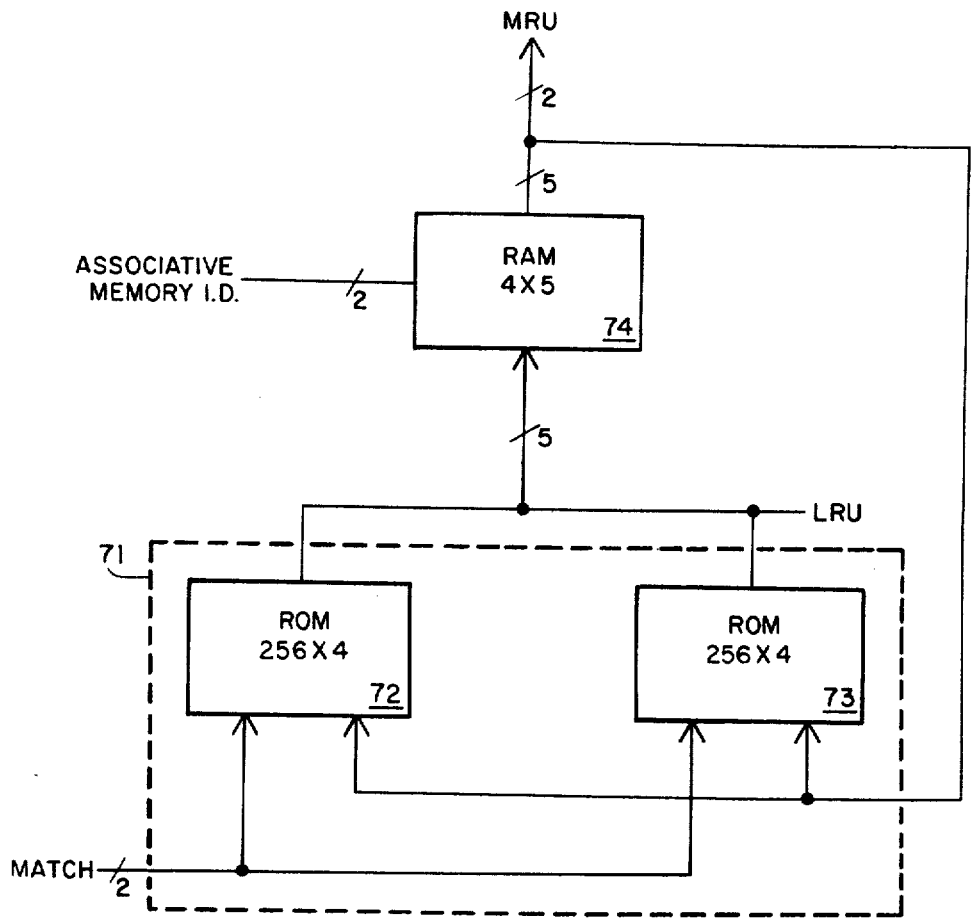
FIG. 7 is a block diagram of an alternate embodiment of the invention.

An alternate embodiment of the invention is shown in FIG. 7 wherein the program logic array 71 is illustrated to comprise of two 256 × 4 ROM's 72 and 73 as these are readily available commerical configurations. The output of the ROM is tapped to provide LRU information and is also connected to a 4 × 5 RAM storage device 74 where is stored the new order to priority for each one of the associative memories with which the invention is to be used. The RAM is addressable to read out the old priority order for the particular associative memory to be updated which information is connected back to the program logic array with the new MATCH data for that particular associative memory to generate from the ROM's a new order of priority. A specified output lead of the RAM 74, also provides MRU output data which is useful in guessing schemes wherein an attempt is made to identify in advance the next data or sequence of data to be obtained from memory.

Thus, in this manner one can dynamically update a plurality of associative memories of at least four words each and simultaneously make available knowledge of at least recently used and most recently used location within the selected memory.

What is claimed is:

1. A system for automatically maintaining a record for an order of priority of segments of data each segment stored in a separately identifiable location of a high speed memory means and comparing each segment stored in the locations with a newly received data segment to be stored in the high speed memory to generate a comparison output denoting whether or not the newly received segment is already stored in one of said locations, and where the order of priority of segments stored in the high speed memory means is based on usage of the segments, the improvement comprising read only memory means having a bit configuration representing an algorithm, responsive to both said comparison output and a storage means output representing an existing order of segment priority, to provide a first output representing the least recently used location of the high speed memory means and a second output representing for a subsequent machine cycle the new order of priority for the segments stored in high speed memory locations, and;

storage means connected with said first and second outputs and connected for feed back during a subsequent machine cycle the new order of segment priority to an input of said read only memory means.

2. A system according to claim 1 further including:

means for invalidating a segment of data in a selected location in said high speed memory means, and;

said read only memory, means responsive to said invalidating means for defining the invalidated segment in said select location as the least recently used segment.

3. A system according to claim 2 further including:

holding means connected to said read only memory means for storing said comparison output for a subsequent machine cycle.

4. A system according to claim 1 further including:

means for enabling the read only memory means to generate said first and second outputs after the completion of each machine cycle.

5. A system according to claim 1 wherein said high speed memory includes an associative memory.

6. A system according to claim 5 wherein said read only memory means includes:

first read only memory means and second read only memory means, each having common input connections, said second read only memory means providing said first output comprising a four bit output representative of the least recently used location in said associative memory, and said first read only memory means providing said second output comprising a four bit output, which together with two selected bits from said second read only memory means is fed to said storage means and represents the order or segment priority.

7. A system according to claim 1 further including: logic means responsive to the comparison output, for enabling said read only memory means to provide said storage means with the new order of priority of said high speed memory locations for a subsequent machine cycle.

* * * * *